June 5, 1956
J. V. WILLIFORD, JR
2,749,459
PLURAL UNIT INDUCTION MOTOR
Filed July 16, 1953
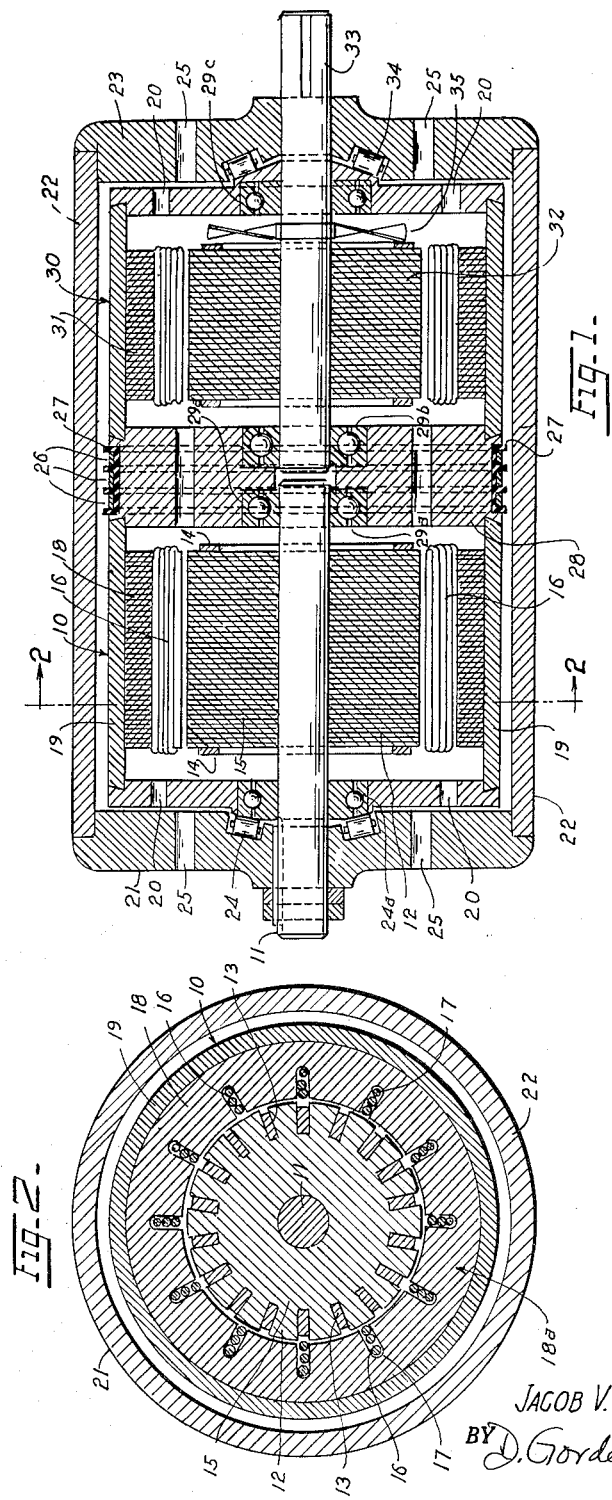
INVENTOR.
JACOB V. WILLIFORD, JR.
BY D. Gordon Angus
ATTORNEY.

United States Patent Office 2,749,459
Patented June 5, 1956

2,749,459

PLURAL UNIT INDUCTION MOTOR

Jacob V. Williford, Jr., Downey, Calif., assignor, by mesne assignments, to Lido Land Co., Los Angeles, Calif., a copartnership Application July 16, 1953, Serial No. 368,387

1 Claim. (Cl. 310—122)

This invention pertains to rotary power sources and in particular to a plural element power source in which adjacent elements have mechanically interconnected components which rotate together and other mechanically independent components with different rotary speeds from each other.

An object of this invention is to provide a means utilizing a plurality of rotary elements to provide a power source with an ultimate rotational speed different from that of either element thereof.

A related object is to provide such a power source having a power output which varies as the speed changes.

Another object is to provide a high speed rotary power source in which the bearings may rotate at a speed no higher than that of the fastest element.

A need exists for a means to obtain various speeds from electric motors without extensive redesign or complex equipment such as frequency changers and the like. Particularly in synchronous and induction type motors, where the speed is determined by the number of poles and the frequency, it would be desirable to obtain higher or lower speeds and power without going to larger or faster machines, or the expense of frequency changers and the like.

A disadvantage inherent in many devices for increasing rotary speeds is that the speed changer, which may be a belt or gear device, in addition to introducing losses due to friction, also decreases the power and torque available for useful work as the speed is raised. Other electrical couplings which utilize a "slip" principle for slowing rotary speeds, waste power accordingly. The present invention provides a powered speed changing coupling which, when the speed increases, can also increase the power.

A feature of this invention is an electric motor as a first element mounted on the rotary component of a second element, which second element may be another electric motor or such a power driven device as a turbine, so that one component of the first element rotates at the same speed as the rotary component of the second element.

A further feature resides in the first element's being powered so that its components have relative rotation between themselves. The resultant speed of the component of the first element not connected to a component in the second element is determined by the relative speeds of the elements.

Another feature resides in a plural-element power source in which the elements are arranged in tandem so that a component of one element is coupled to a component of another element, the remaining components operating independently of each other, with bearings installed between components at each successive step of rotary speeds. The maximum bearing speed then is no greater than the rotary speed within the fastest element.

These and other features of the invention will be better understood from the following detailed description and the accompanying drawings, of which:

Fig. 1 is a side cross-sectional elevation of the device according to the present invention; and Fig. 2 is a cross-sectional view of the device taken along line 2—2 of Fig. 1.

A power source constructed in accordance with this invention is shown in Fig. 1. In a preferred embodiment, a first rotary element 10 is a typical induction motor having a non rotating central shaft 11 fixed in frame end member 21. A common squirrel cage 12 is rigidly affixed to the shaft 11, and is shown in greater detail in Fig. 2. The squirrel cage will hereafter be considered the reference component or reference member of the first element 10. The squirrel cage has a plurality of conductive bars 13 uniformly spaced around the shaft. These bars extend between conductive end rings 14 in a generally longitudinal direction relative to the shaft according to well-known practice so that they form continuous cricuits with each other through the rings. In order to increase the magnetic flux, the bars 13 are embedded in a stack of iron laminations 15 which also surround the shaft, to which they are affixed.

The squirrel cage is concentrically surrounded by, and separated from, a typical armature winding 16 as commonly used in induction motors, which windings are fitted into slots 17 in a yoke 18. This yoke and its windings which make up the armature 18a will be referred to as the rotary component of the first element. The armature is rigidly affixed to a rotary shell 19 which encloses the above-described components and has vent holes 20 in its ends.

The device has a stationary case comprising a first end member 21, an annular section 22, and a second end member 23. The end member 21 is rigidly affixed to shaft 11. The shell 19 is separated from the case by bearings 24 which are inclined so as to support the shell both axially and radially, and is separated from the shaft 11 by bearings 24a. The case end members also have vents 25 in them so as to permit flow of coolant air through the device when it is in operation. At the mid-point of shell 19, three slip rings 26 extend circumferentially around the shell and are separated from each other and from other metallic parts by insulation 27. This assumes a three-phase armature winding, since the number of slip rings needed may vary with the number of phases. Any number of phases may be used in a device of this type, including single phase. As the electrical connections from the supply to the slip rings and from the slip rings to the three-phase windings are conventional, they are not shown in the drawings. A block 28 supports the slip rings and the shell 19 at the mid-point, and has bearings 29a next to the shaft 11 to permit relative rotation of the shell and other moving components with respect to the shaft 11.

A second induction motor 30, similar in every respect to the first element just described also has an outer armature 31 and an inner squirrel cage 32, the details of which need not be repeated since they have been already described in connection with motor 10. In this second element, the armature will be referred to as the reference component, and the squirrel cage the rotary component or member. The squirrel cage in this motor is attached to shaft 33. Bearings 29b support the shaft 33 in block 28, and bearings 29c support the shaft from the shell. Another set of bearings 34 supports this end of the shell from the case as to both axial and radial movement. The armature 31 is also assumed to have the same number of phases, namely three-phase, and will be connected to the slip rings similarly to armature 18a. The two motors are thus both shunted across the power line, the power line being considered a power driven means for causing rotation between the components of the elements. A fan blade 35 moves air through the elements while they are in operation. It will be observed that shafts 11 and 33 are rotationally independent of each other.

In the operation of this device as a power source, the electric supply is connected to the slip rings and the two elements thereupon proceed to operate as motors. Shaft 11 is stationary, as is its squirrel cage. Then armature 18a and shell 19 are driven at a speed determined by the frequency and the number of poles. As an example, assume that both the motors shown are two-pole, operating on 60 cycle current. This means that the shell 19 will rotate at two-pole speed, or 3600 R. P. M. (neglecting slip). Such speed is determined in synchronous and induction type motors by the familiar equation:

$$R.\ P.\ M. = \frac{(120)(\text{frequency})}{(\text{number of poles})}$$

Then, since the motor 30 is exactly similar, it too will rotate within itself at about 3600 R. P. M. It is, of course, immaterial to motor 30 that one of its components (the reference member) has an initial rotary velocity. The speed of shaft 33 will therefore be about 7200 R. P. M. with respect to the zero speed of shaft 11.

Examination of the drawings with respect to the disposition of the bearings indicates that no bearings will be required to rotate faster than the speed of the fastest element, in this case about 3600 R. P. M. Bearings 24 are disposed between shell 19 and end member 21; bearings 29a and 24a are disposed between the shell and the shaft 11 near the middle and end of the shell respectively; another two sets of bearings 29a, 29b are between shell 19 and shaft 33; and still another set 34 are between shell 19 and end member 23. In each of the cases just listed, the rate of relative rotation of the components separated by bearings is 3600 R. P. M. Thus the bearings need be designed only for a speed which is one-half the maximum speed produced by the power source as a whole, which is a great aid in the selection and design of bearings for such applications. Also, bearing wear is reduced. In arrangements where both elements do not rotate at the same speed, the fastest bearing speed may not be equal to exactly one half of the speed finally produced, but will be less than that value, depending on the relative rates and direction of rotation of the elements.

In addition it will be noted that this increase in speed has not been accompanied by a decrease in torque or power. As the speed was doubled, so was the power. This results from the fact that both elements are powered and contribute to the speed and power in tandem arrangement.

By selecting and combining various types of squirrel cages and windings, a wide range of speeds may be obtained while using familiar and commercially available components. In addition to adding the speeds of two elements, one element may be driven in an opposite direction from the other so as to obtain a speed less than that of the fastest motor. Such a reversal of direction may be obtained in a well-known manner by reversing proper armature leads on one of the motors.

A further advantage in this coupling when used as a speed reducer is that the slower element operates as a generator, sending power back into the supply line to aid the power driving the faster element. This is an improvement over speed reducing couplings which simply waste such power in eddy currents and the like.

A few of the speeds available (neglecting slip in each case) from combining induction or synchronous motors operating on 60 cycle current with various numbers of poles are shown in the following table:

| First element (poles) | Second element (poles) | Possible speeds (R. P. M.) |
|---|---|---|
| 2 | 2 | 3,600, 7,200 |
| 4 | 2 | 1,800, 3,600, 5,400 |
| 6 | 2 | 2,400, 3,600, 4,800 |
| 4 | 4 | 1,800, 3,600 |
| 6 | 4 | 600, 1,800, 3,000 |
| 6 | 6 | 1,200, 2,400 |

With the single motors of the above, speeds available are only the following 2 pole, 3600; 4 pole, 1800; 6 pole, 1200.

The two six pole elements arranged in accordance with the invention provide a 60-cycle speed of 2400 R. P. M. not available with single motor elements, illustrating a further advantage of the invention with respect to choice of speeds.

It will be further noted that by mounting the second motor on the shaft of a variable speed D. C. motor or other variable speed driving element, this system with its many advantages will result in an infinite number of possible speeds between the difference and the sum of the individual speeds of the elements.

While the invention has been illustrated by two motors with their outer components mechanically interconnected, many other combinations may be devised within the purview of the invention, depending on the application for which the device is intended. As examples, the two shafts may be interconnected, one casing being fixed, and the other casing rotating at the resultant speed. As another example, a shaft of one and the outer number of an adjacent element might be interconnected.

In addition it should be noted that it is not necessary that an electric motor be used in both elements or that both elements need necessarily be induction type motors, nor poly-phase. One can use other A. C. or D. C. motors, or synchronous motors, the latter being especially useful because of their practically constant speed. Or for further examples, the same results would be obtained by driving a shaft with an ordinary steam turbine or gasoline engine as the first element, and mounting an electric motor as the second element on the end of the shaft of the first element. In that manner the same change in speed may be obtained as with the device illustrated above. The induction motor has been shown as an illustration of a simple means for achieving the results according to the present invention. The invention is not to be restricted to any particular kind of apparatus, but includes any means by which two power sources are mounted in tandem, a component of one rotating as a unit with a component of the other so that the resultant speed of the elements is a function of their individual speeds and directions. This invention has the further merit of being subject to the same changes in speed as any other device incorporating similar components. For instance, in the embodiment shown, the frequency may be changed and the resultant shaft speed will be altered in accordance with well-understood principles of electric motors, still retaining the advantages of drastically reduced bearing speeds and wear, and providing a constant torque and increased power.

I claim:

A plural element power source comprising in combination, a supporting frame, a central shaft non-rotatably secured to one end of the frame, a coaxial shaft passing freely through the other end of the frame, a shell rotatable on two bearings, one carried by each of the two shafts near the proximate end of the frame, two coaxial induction motors with primary and secondary elements, one element of each carried by the shell and the other element being carried by one of the two shafts, a central annular block rotating with said shell, having a bearing on the central shaft proximate the inner end of the shaft and having a spaced companion proximate bearing supporting the inner end of said coaxial shaft, a conical projection extending from the shell coaxial with the two shafts, a circular series of inclined rollers engaging the conical projection and the supporting frame, and a second series of roller bearings oppositely inclined at the central shaft end of the frame, said two roller bearings supporting the shell both axially and radially, each of the series of inclined rollers being of a greater over-all diameter than the proximate shell-shaft bearing.

References Cited in the file of this patent

UNITED STATES PATENTS

| | | |
|---|---|---|
| 1,388,555 | Eades | Aug. 23, 1921 |
| 1,491,441 | Thomson | Apr. 22, 1924 |
| 1,630,201 | Metcalf | May 24, 1927 |

FOREIGN PATENTS

| | | |
|---|---|---|
| 404,816 | Great Britain | Jan. 25, 1934 |
| 832,957 | France | July 11, 1938 |
| 952,340 | France | May 2, 1949 |